(12) United States Patent
Reed et al.

(10) Patent No.: US 11,770,328 B2
(45) Date of Patent: Sep. 26, 2023

(54) NETWORK INCLUDING DATA INTEGRITY MONITORING

(71) Applicant: The Boeing Company, Chicago, IL (US)

(72) Inventors: Alec Reed, Kirkland, WA (US); Sean Ramey, Lake Stevens, WA (US); James Matthew Zaehring, Edmonds, WA (US); Donald R. Tracy, Everett, WA (US); David Carl Matthews, Duvall, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/497,578

(22) Filed: Oct. 8, 2021

(65) Prior Publication Data
US 2022/0255850 A1  Aug. 11, 2022

Related U.S. Application Data

(60) Provisional application No. 63/146,829, filed on Feb. 8, 2021.

(51) Int. Cl.
*H04L 45/28* (2022.01)
*H04L 41/0677* (2022.01)
*H04L 41/0681* (2022.01)
*H04L 43/04* (2022.01)
*H04L 45/745* (2022.01)

(52) U.S. Cl.
CPC ......... *H04L 45/28* (2013.01); *H04L 41/0677* (2013.01); *H04L 41/0681* (2013.01); *H04L 43/04* (2013.01); *H04L 45/745* (2013.01)

(58) Field of Classification Search
CPC .. H04L 41/0677; H04L 41/0681; H04L 43/04
See application file for complete search history.

(56) References Cited

U.S. PATENT DOCUMENTS

| | | | |
|---|---|---|---|
| 8,213,321 B2* | 7/2012 | Butts | H04L 43/0847 370/242 |
| 10,764,214 B1* | 9/2020 | Plenderleith | H04L 45/02 |
| 2005/0120259 A1* | 6/2005 | Aoki | G06F 11/2028 714/4.11 |
| 2010/0005345 A1* | 1/2010 | Ferraiolo | G11C 29/022 714/E11.006 |

(Continued)

OTHER PUBLICATIONS

Extended European Search Report dated Jun. 30, 2022 for European Patent Application No. 22155441.3, 8 pages.

(Continued)

*Primary Examiner* — Philip C Lee
(74) *Attorney, Agent, or Firm* — Sage Patent Group

(57) ABSTRACT

A method for monitoring data integrity on a network includes reading error data from an interface associated with a particular link of the network in response to error data being present in a message received on the particular link. The method also includes creating a report message including the error data and transmitting the report message to a network monitoring algorithm operable on a processor circuit. The network monitoring algorithm is configured to determine a data integrity of the particular link based on the error data.

19 Claims, 9 Drawing Sheets

(56) References Cited

U.S. PATENT DOCUMENTS

| | | | |
|---|---|---|---|
| 2014/0298110 A1* | 10/2014 | Hammerschmidt | G06F 11/076 714/47.2 |
| 2018/0091962 A1* | 3/2018 | Hernandez | H04M 1/72418 |
| 2018/0145823 A1* | 5/2018 | Seo | H04L 43/0858 |
| 2018/0196710 A1* | 7/2018 | Iyer | H04L 1/0045 |
| 2018/0349217 A1* | 12/2018 | Borlick | G06F 11/0745 |
| 2019/0215008 A1* | 7/2019 | Ran | H03M 13/13 |
| 2020/0145437 A1* | 5/2020 | Torisaki | H04L 63/126 |
| 2020/0192749 A1* | 6/2020 | Richter | G06F 11/1004 |
| 2022/0256544 A1* | 8/2022 | Fu | H04W 72/0493 |

OTHER PUBLICATIONS

Peterson, W. Wesley et al., Error-Correcting Codes, Second Edition 1972, The MIT Press, pp. 228-229, 4 pages.

Fujiwara, Toru et al., "Error Detecting Capabilities of the Shortened Hamming Codes Adopted for Error Detection in IEEE Standard 802.3," IEEE, 1989, 4 pages.

Koopman, Philip, "32-Bit Cyclic Redundancy Codes for Internet Applications," Int. Conf. Dependable Systems and Networks (DSN), Washington, DC, Jul. 2002, pp. 459-468.

Koopman, Philip et al., Selection of Cyclic Redundancy Code and Checksum Algorithms to Ensure Critical Data Integrity, US Department of Transportation, Federal Aviation Administration, DOT/FAA/TC-14/49, Mar. 2015, 111 pages.

Wikipedia, "Frame check sequence," accessed on the Internet on May 28, 2020 at: https://en/wikipedia.org/wiki/Frame_check_sequence, 2 pages.

* cited by examiner

NETWORK INCLUDING DATA INTEGRITY MONITORING

CROSS-REFERENCE TO RELATED APPLICATIONS

The present application claims benefit of priority to U.S. Provisional Patent Application No. 63/146,829 filed Feb. 8, 2021.

FIELD

The present disclosure relates to data communications and networks and more particularly to a network including data integrity monitoring.

BACKGROUND

Networks for communicating data, such as a data network onboard an airplane or other system, specify a probability of undetected erroneous data that is allowable for continued operation of the airplane or system. Possible types of corruption on data networks include message impersonation, ordinal integrity violation, excessive or increased latency, and data corruption. There is some probability of corruption from a line replaceable unit (LRU) or physical layer causes, such as electromagnetic emissions, vibration, dirty fiber optics, etc. Data integrity monitoring on a network, particularly a data network onboard an airplane, is important for corrective action to be taken and to avoid or minimize grounding of the airplane.

SUMMARY

In accordance with an example, a method for monitoring data integrity on a network includes reading error data from an interface associated with a particular link of the network in response to error data being present in a message received on the particular link. The method also includes creating a report message including the error data and transmitting the report message to a network monitoring algorithm operable on a processor circuit. The network monitoring algorithm is configured to determine a data integrity of the particular link based on the error data.

In accordance with an example and any of the preceding examples, a method for monitoring data integrity on a network includes receiving a message over a link of the network by a network switch or a network node. The method also includes determining if the message includes error data and creating a report message in response to the message including error data. The method additionally includes transmitting the report message to a network data integrity manager to determine whether the link has a fault.

In accordance with another example and any of the preceding examples, a network including data integrity monitoring comprises a plurality of network switches. The plurality of network switches are configurable to selectively interconnect two or more network nodes from a plurality of network nodes. Each network switch includes a network switch processor circuit and a switching function operable on the network switch processor circuit. The switching function is configured to selectively connect the network switch to another network switch or a network node from the plurality of network nodes. Each network switch also includes a network switch error data reporting function operable on the network switch processor circuit and configured to: read error data from a switch interface associated with a particular link of the network; create a network switch report message including the error data; and transmit the network switch report message to a network monitoring algorithm. The network monitoring algorithm is configured to determine a data integrity of the particular link.

In accordance with an example and any of the preceding examples, the method and network further include determining the data integrity of the particular link by determining if the error data is greater than an error data threshold for the particular link. The data integrity of the particular link is faulty in response to the error data being greater than the error data threshold. The method and network further include performing a predetermined action in response to the particular link being faulty.

In accordance with an example and any of the preceding examples, wherein the predetermined action includes at least one of: shutting down the particular link; or transmitting data using another link of the network until the particular link is repaired.

In accordance with an example and any of the preceding examples, wherein said reading the error data includes reading the error data from a network interface of a network node by an error data reporting function operable on a processor circuit of the network node, and wherein said transmitting the report message includes transmitting the report message by the error data reporting function of the network node.

In accordance with an example and any of the preceding examples, wherein said reading the error data includes reading the error data from a switch interface of a network switch by an error data reporting function operable on a processor circuit of the network switch, and wherein said transmitting the report message includes transmitting the report message by the error data reporting function of the network switch.

In accordance with an example and any of the preceding examples, the method and network further include receiving a particular report message, by a network monitoring node, for each link, from a plurality of links of the network, having error data on the link. The network monitoring node includes the network monitoring algorithm. The method and network further include reading the error data from the particular report message for each link and determining a data integrity of each link by determining if the error data is greater than an error data threshold for each link. The data integrity for the link is faulty in response to the error data being greater than the error data threshold. The method and network further include performing a predetermined action in response to the link being faulty.

In accordance with an example and any of the preceding examples, the method and network further include receiving the message over the particular link, wherein the message is received by one of a network switch or a network node. The method and network further include determining if the message includes the error data by using an embedded error detection method. The method and network further include increasing a count of an error data counter associated with the particular link by one (1) in a memory of the network switch or the network node in response to the error data being present based on the embedded error detection method. The report message is created after a preset time interval expires and the report message includes the count from the error data counter.

In accordance with an example and any of the preceding examples, the method and network further include transmitting the report message by an error data reporting function of the network switch or the network node that received the message, to a network data integrity manager. The network data integrity manager is configured to determine a probability of undetected corrupt messages being transmitted by the particular link using the count from the error data counter.

In accordance with an example and any of the preceding examples, the method and network further include using an embedded error detection method to determine if the message comprises error data.

In accordance with an example and any of the preceding examples, the method and network further include increasing a count of an error data counter associated with the link in response to the message including error data.

In accordance with an example and any of the preceding examples, the method and network further include allowing one or more additional messages to be received over the link in response to a preset time interval not having expired; and increasing the count of the error data counter for each additional message that includes error data.

In accordance with an example and any of the preceding examples, wherein the report message includes the count of the error data counter.

In accordance with an example and any of the preceding examples, the method and network further include adding the count of the error data counter to a count of a corrupted data counter; comparing the count of the corrupted data counter to an error data threshold for the link; and determining that the link has a fault in response to the count of the corrupted data counter being greater than the error data threshold for the link.

In accordance with an example and any of the preceding examples, the method and network further including determining a probability of undetected corrupt messages being transmitted by the link using the count of the corrupted data counter; and transmitting a message that a probability of undetected corruption on the link has exceeded a design value in response to the count of the corrupted data counter being greater than the error data threshold for the link.

In accordance with an example and any of the preceding examples, wherein at least some network nodes from the plurality of network nodes include a network node processor circuit; and a vehicle function operable on the network node processor circuit and configured to perform a particular function associated with a vehicle. At least some network nodes from the plurality of network nodes further include a network node error data reporting function operable on the network node processor circuit and configured to: read error data from a network interface associated with another particular link of the network; create a network node report message including the error data; and transmit the network node report message to the network monitoring algorithm, wherein the network monitoring algorithm is configured to determine a data integrity of the other particular link.

In accordance with an example and any of the preceding examples, wherein the method and network further include a network monitoring node of the plurality of network nodes. The network monitoring node includes a processor circuit; the network monitoring algorithm operable on the processor circuit; a memory associated with the processor circuit; and a configuration table stored in the memory. The configuration table includes an identification of each link from a plurality of links of the network and an error data threshold associated with each link. The configuration table is configured to be used by the network monitoring algorithm to determine if the error data read from an interface associated with a certain link of the network is greater than the error data threshold for the certain link.

In accordance with an example and any of the preceding examples, wherein the network monitoring node is configured to perform a set of functions including: receiving a particular report message for each link from a plurality of links of the network having error data on the link; reading the error data from the particular report message for each link; determining a data integrity of each link by determining if the error data is greater than an error data threshold for each link, wherein the data integrity for the link is faulty in response to the error data being greater than the error data threshold; and performing a predetermined action in response to the link being faulty.

In accordance with an example and any of the preceding examples, wherein the network further includes a network data integrity manager. The network data integrity manager includes a processor circuit and a memory associated with the processor circuit. The memory includes computer-readable program instructions that, when executed by the processor circuit, cause the processor circuit to perform a set of functions including receiving a report error message comprising a count from an error data counter associated with a certain link. The count of the error data counter is increased in response to each message received over the particular link that includes error data. The set of functions also include adding the count of the error data counter to a count of a corrupted data counter. The set of functions further include comparing the count of the corrupted data counter to an error data threshold for the particular link and determining that the particular link has a fault in response to the count of the corrupted data counter being greater than the error data threshold for the particular link.

The features, functions, and advantages that have been discussed can be achieved independently in various examples or may be combined in yet other examples further details of which can be seen with reference to the following description and drawings.

DETAILED DESCRIPTION

Figure 1A:
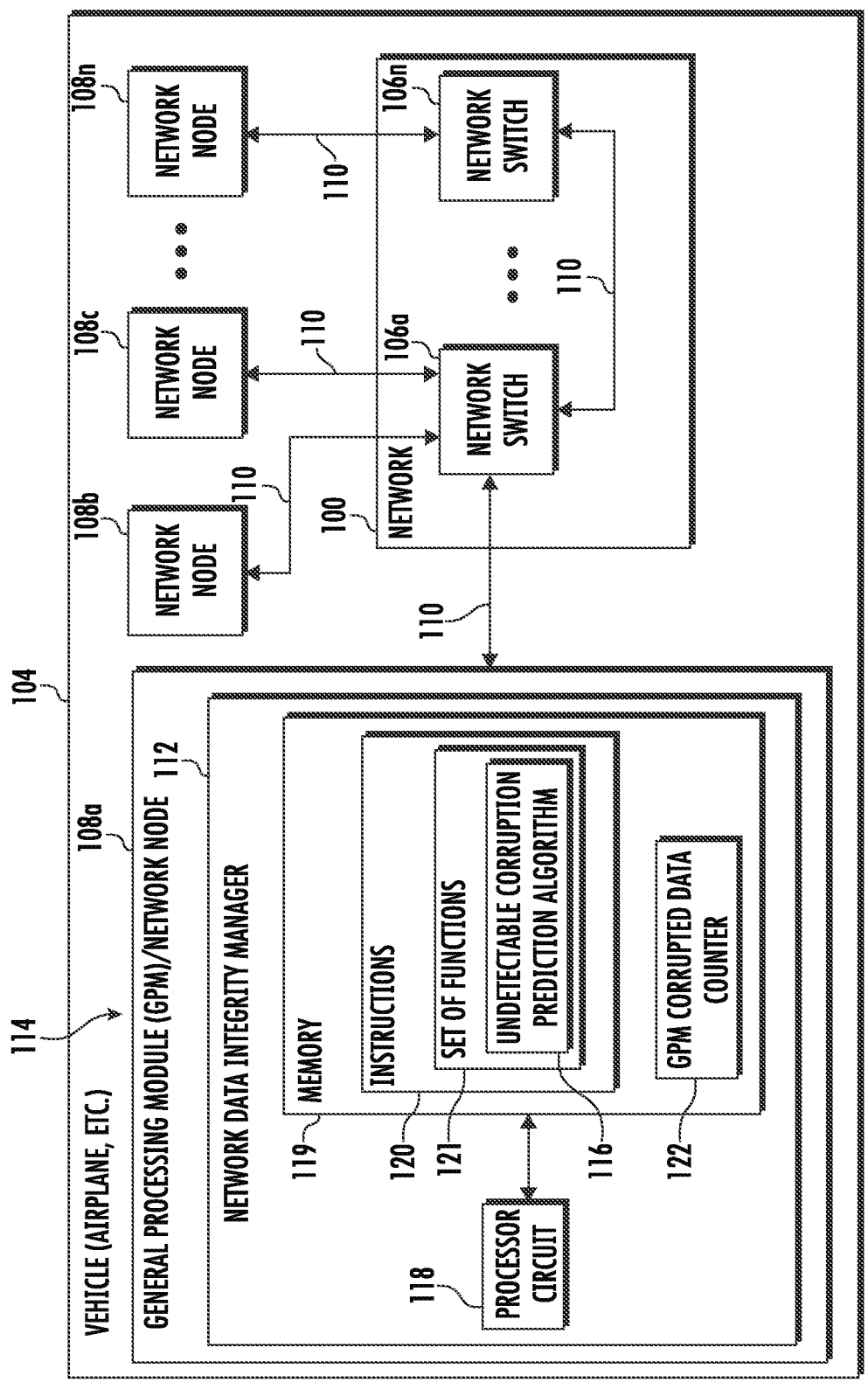
FIG. 1A is a block schematic diagram of an example of a network including data integrity monitoring in accordance with an example of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1A is a block schematic diagram of an example of a network 100 including data integrity monitoring in accordance with an example of the present disclosure. In accordance with an example, the network 100 is a data network onboard a vehicle 104, such as an airplane or other vehicle or system. The network 100 includes a plurality of network switches 106 labeled as 106a-106n in FIG. 1A. The plurality of network switches 106a-106n are configurable to selectively interconnect two or more network nodes 108, labeled as 108a-108n in FIG. 1A by links 110. As described in more detail with reference to FIG. 1B, at least some of the network switches 106 and network nodes 108 are configured for data integrity monitoring or include features for data integrity monitoring. Additionally, in accordance with some examples, a network data integrity manager 112 is configured to monitor data integrity. An example of a method for monitoring data integrity on a network that is performable by the network data integrity manager 112 will be described in more detail with reference to FIGS. 7A and 7B.

In accordance with the example in FIG. 1A, the network data integrity manager 112 is embodied in a general processing module 114. In some examples, the general processing module 114 is also a network node 108a. The network data integrity manager 112 is configured to monitor data integrity on the network 100, as described in more detail herein, and perform a predetermined action or actions in response to detecting error data on a link 110 associated with a particular network switch 106 or network node 108. Examples of the predetermined action include, but are not necessarily limited to, shutting down the particular link 110, transmitting messages or data via an alternate link 110, and/or generating and transmitting a message indicating there is a fault on the particular link 110. The message is transmitted to a responsible entity, so that the link 110 can be repaired or replaced. Possible causes of error data on a link 110 include message impersonation, ordinal integrity violation, excessive or increased latency, and data corruption. Additionally, corruption or error data can be caused by a line replaceable unit (LRU) in the network 100 or a physical layer, such as electromagnetic emissions, vibration, dirty fiber optics, etc.

In the example in FIG. 1, the network data integrity manager 112 includes an undetectable corruption prediction algorithm 116. The undetectable corruption prediction algorithm 116 is configured to predict an amount of undetected corrupt data or a number of undetected messages including error data 128 that may have been transmitted over a particular link 110 based on a number of corrupt messages or number of messages including error data that are detected. Corrupt data and error data have the same meaning and may be used interchangeably herein. In one example, the undetectably corruption prediction algorithm 116 is configured to predict an amount of undetected corrupt data or a number of undetected messages including error data 128 by using network traffic quantity or rate information, message sizes, and link speed combined with mathematical error models for how many error patterns are detected by a Frame Check Sequence's CRC (or other protection methods) versus how many go undetected. In some examples, a configuration table 168 (FIG. 2) also includes the network traffic quantity or rate information, message sizes and link speed for each link 110.

In the example illustrated in FIG. 1A, the general processing module 114 or network data integrity manager 112 includes a processor circuit 118 and an associated memory 119. The memory 119 includes computer-readable program instructions 120 that, when executed by the processor circuit 118, cause the processor circuit 118 to perform a set of functions 121. An example of the set of functions 121 includes the undetectable corruption prediction algorithm 116.

The network data integrity manager 112 also includes a corrupted data counter 122. As described in more detail herein with reference to FIGS. 7A and 7B, a count of the corrupted data counter 122 is compared to a preset data threshold for a particular link 110. If the count is less than or equal the preset threshold, no action is taken. If the count is greater than the preset threshold, the undetectable corruption prediction algorithm 116 uses the count from the corrupted data counter 122 to determine a probability of undetected corrupt messages being transmitted by the particular link 110. The network data integrity manager 112 performs the predetermined action in response to the count being greater than the preset threshold. The preset threshold is adjustable for each link 110 to tune the data integrity monitoring of the network 100. For example, some network nodes 108 that perform more important or critical vehicle functions require a higher level of data integrity compared to other network nodes 108 that perform less important or less critical vehicle functions. Network nodes 108 and associated links 110 that perform more important or critical vehicle functions will have less tolerance for corrupt data or messages and will have a lower preset threshold compared to other network nodes 108 and associated links 110 that perform less important or critical vehicle functions. These network nodes 108 and associated links 110 will have a higher tolerance for corrupt data or messages or can accept a higher incidence of corrupt data or messages and will have a corresponding higher preset threshold.

Figure 1B:
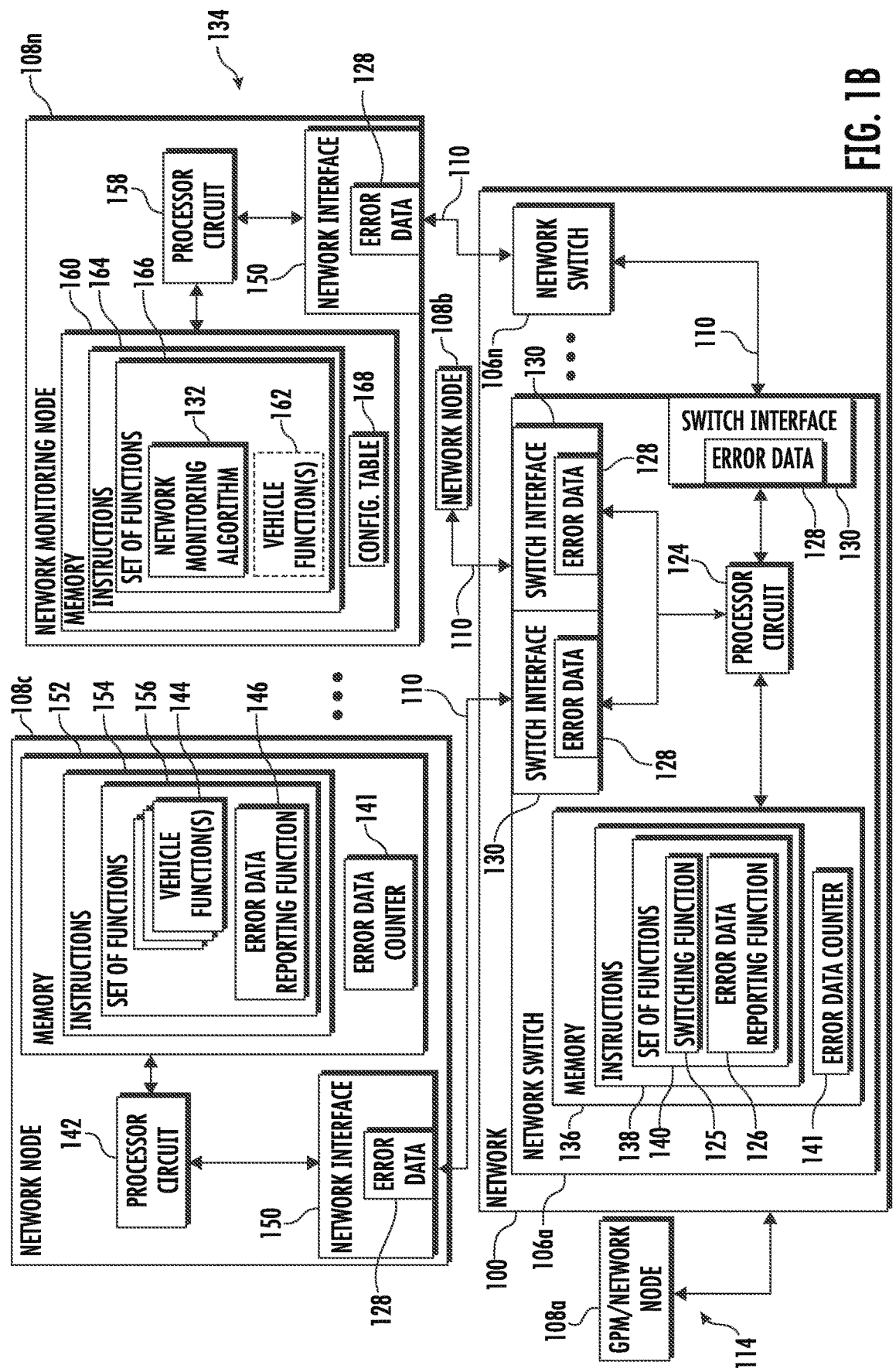
FIG. 1B is a block schematic diagram of the exemplary network in FIG. 1A including examples of a network switch and network nodes configured for data integrity monitoring in accordance with an example of the present disclosure.

Referring to FIG. 1B, FIG. 1B is a block schematic diagram of the exemplary network 100 in FIG. 1A including examples of a network switch 106 and network nodes 108 configured for data integrity monitoring in accordance with an example of the present disclosure. As previously described, the network 100 includes a plurality of network switches 106a-106n. The plurality of network switches 106a-106n are configurable to selectively interconnect two or more network nodes 108a-108n of the plurality of network nodes 108a-108n. Each network switch 106 includes a network switch processor circuit 124 and a switching function 125 operable on the processor circuit 124 and configured to selectively connect the network switch 106 to another network switch 106 or to a network node 108 of the plurality of network nodes 108a-108n.

Figure 4:
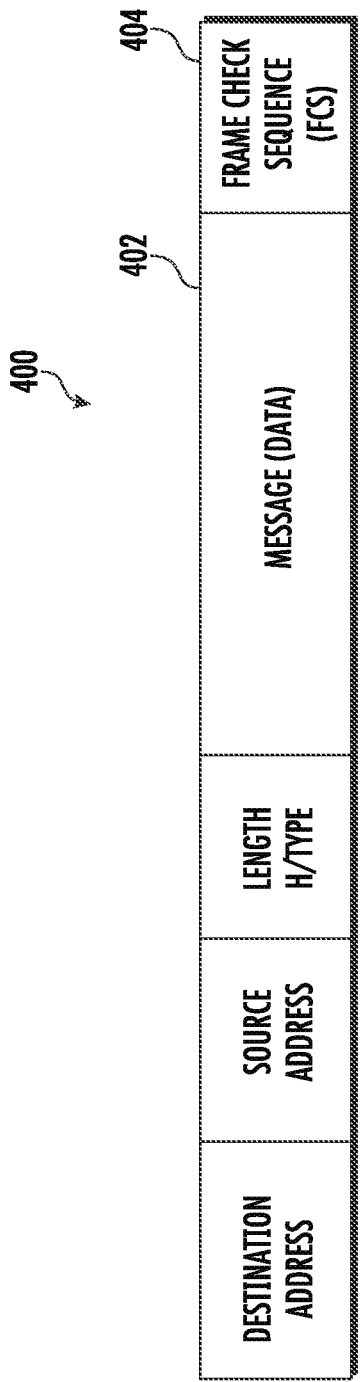
FIG. 4 is an example of a message including data and an embedded error detection code for data integrity monitoring in accordance with an example of the present disclosure.

Each network switch 106 also includes a network switch error data reporting function 126 operable on the network switch processor circuit 124. The error data reporting function 126 is configured to read error data 128 from a switch interface 130 associated with a particular link 110 of the network 100. In some examples, reading error data from a switch interface 130 includes using an embedded error detection method to determine if a message received by the switch interface 130 includes error data 128. Examples of embedded error detection methods include, but are not necessarily limited to, cyclic redundancy checks (CRCs) embedded in a message and a frame check sequence (FCS) embedded in the message. Referring also to FIG. 4, FIG. 4 is an example of a message 400 including data 402 and an embedded error detection code 404 for data integrity monitoring in accordance with an example of the present disclosure. In the example message 400 in FIG. 4, the embedded error detection code 404 is a frame check sequence.

The error data reporting function 126 is also configured to create a network switch report message including the error data and to transmit the network switch report message to a network monitoring algorithm 132. The network monitoring algorithm 132 is configured to determine a data integrity of the particular link 110. In accordance with the example illustrated in FIG. 1B, the network monitoring algorithm 132 is embodied on and performed by a network node 108, for example, a network monitoring node 134 or 108n. In some examples, a network monitoring node 134 is used in place of the general processing module 114 and network data integrity manager 112.

In accordance with some examples, each network switch 106 includes a processor circuit 124 and a memory 136 associated with the processor circuit 124. The memory 136 includes computer-readable program instructions 138 that, when executed by the processor circuit 124, cause the processor circuit 124 to perform a set of functions 140. An example of the set of functions will be described in more detail with reference to FIGS. 6A-6B. In the example in FIG. 2B, the set of functions 140 include the switching function 125 operable on the processor circuit 124. The switching function 125 is configured to selectively connect the network switch 106a to another network switch 106 or to a network node 108 of the plurality of network nodes 108a-108n.

The set of functions 140 also include a network switch error data reporting function 126 operable on the network switch processor circuit 124. In some examples, the set of functions 140 or error data reporting function 126 includes reading error data 128 from a switch interface 130 associated with a particular link 110 of the network 100. The set of functions 140 or the error data reporting function 126 also includes creating a network switch report message including the error data 128. The set of functions 140 or the error data reporting function 126 further include transmitting the network switch report message to a network monitoring algorithm 132. The network monitoring algorithm 132 is configured to determine a data integrity of the particular link 110 based on the error data.

In accordance with some examples, each network switch 106 also includes an error data counter 141. As described with reference to FIG. 7A, a count of the error data counter 141 associated with a particular link 110 is increased by one (1) in response to a message received by the network switch 106 including error data 128 or error data 128 being read from the switch interface 130. In the example in FIG. 1B, the error data counter 141 is stored in the memory 136 of the network switch 106.

At least some network nodes 108, for example network node 108c in FIG. 1B, of the plurality of network nodes 108a-108n include a processor circuit 142 and a vehicle function 144 or functions operable on the network node processor circuit 142. The vehicle function 144 is configured to perform a particular function associated with the vehicle 104. In some examples, the processor circuit 142 is the same type or similar to the processor circuit 124 of a network switch 106. In other examples, the processor circuit 142 is different from the processor circuit 124 of the network switch 106.

The network node 108 also includes a network node error data reporting function 146 operable on the network node processor circuit 142. The network node error data reporting function 146 is configured to read error data 128 from a network interface 150 associated with a particular link 110 of the network 100. The error data reporting function 146 of the network node 108 is also configured to create a network node report message including the error data 128. The error data reporting function 146 of the network node 108 is further configured to transmit the network node report message to the network monitoring algorithm 132. As previously described, the network monitoring algorithm 132 is configured to determine a data integrity of the particular link 110.

In accordance with some examples, each network node 108 includes a processor circuit 142 and a memory 152 associated with the processor circuit 142. The memory 152 includes computer-readable program instructions 154 that, when executed by the processor circuit 142, cause the processor circuit 142 to perform a set of functions 156. An example of the set of functions 156 will be described in more detail with reference to FIGS. 6A-6B. In the example in FIG. 1B, the set of functions 156 include one or more vehicle functions 144 and the error data reporting function 146.

In accordance with some examples, at least some network nodes 108 also include an error data counter 141. As described with reference to FIG. 8A, a count of the error data counter 141 associated with a particular link 110 is increased by one (1) in response to a message received by the network node 108 including error data 128 or error data 128 being read from the network interface 150. In the example in FIG. 1B, the error data counter 141 is stored in the memory 152 of the network node 108.

In some examples, the plurality of network nodes 108a-108n include a network monitoring node 134. The network monitoring node 134 includes a processor circuit 158 and the network monitoring algorithm 132 operable on the processor circuit 158. The processor circuit 158 may be the same or similar to processor circuits 124 and 142 or may be a different type processor circuit.

The network monitoring node 134 also includes a memory 160 associated with the processor circuit 158. In the example in FIG. 1B, the memory 160 stores the network monitoring algorithm 132. In some examples, the memory 160 also stores one or more vehicle functions 162 that are executed by the processor circuit 158. The memory 160 includes computer-readable program instructions 164 that, when executed by the processor circuit 158, cause the processor circuit 158 to perform a set of functions 166. An example of the set of functions 166 will be described in more detail with reference to FIGS. 6A-6B. In the example in FIG. 1B, the set of functions 156 optionally include one or more vehicle functions 162 and the network monitoring algorithm 132.

Figure 5:
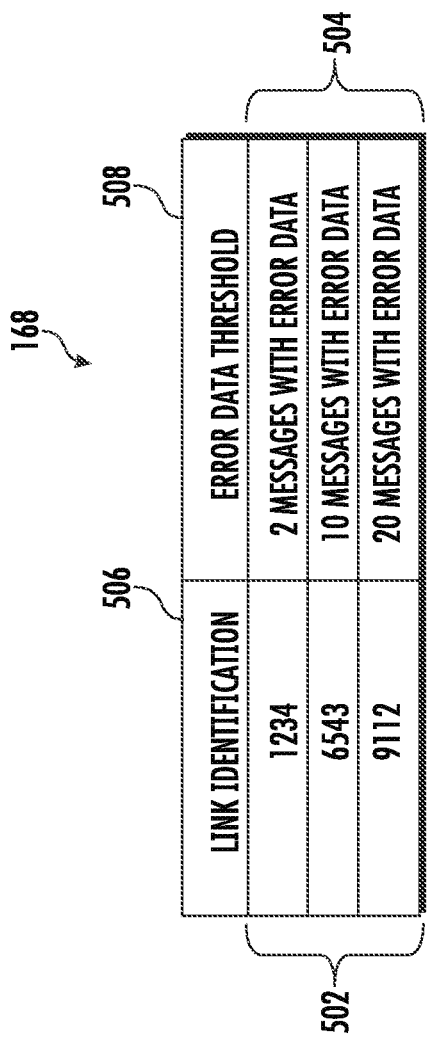
FIG. 5 is an example of a configuration table including an identification of each link of a plurality of links of a network and an error data threshold associated with each link in accordance with an example of the present disclosure.

In some examples, the network monitoring node 134 also includes a configuration table 168 stored in the memory 160. Referring also to FIG. 5, FIG. 5 is an example of a configuration table 168 including an identification 502 of each link 110 of a plurality of links 110 of the network 100 and an error data threshold 504 associated with each link 110. In the example in FIG. 5, the configuration table 168 includes a first column 506 of link identifications 502 and a second column 508 with an associated error data threshold 504. The configuration table 168 is configured to be used by the network monitoring algorithm 132 and/or undetectable corruption prediction algorithm 116 to determine if the error data 128 read from an interface 130 or 150 associated with a certain link 110 of the network 100 is greater than the error data threshold 504 for the certain link 110.

Figure 2:
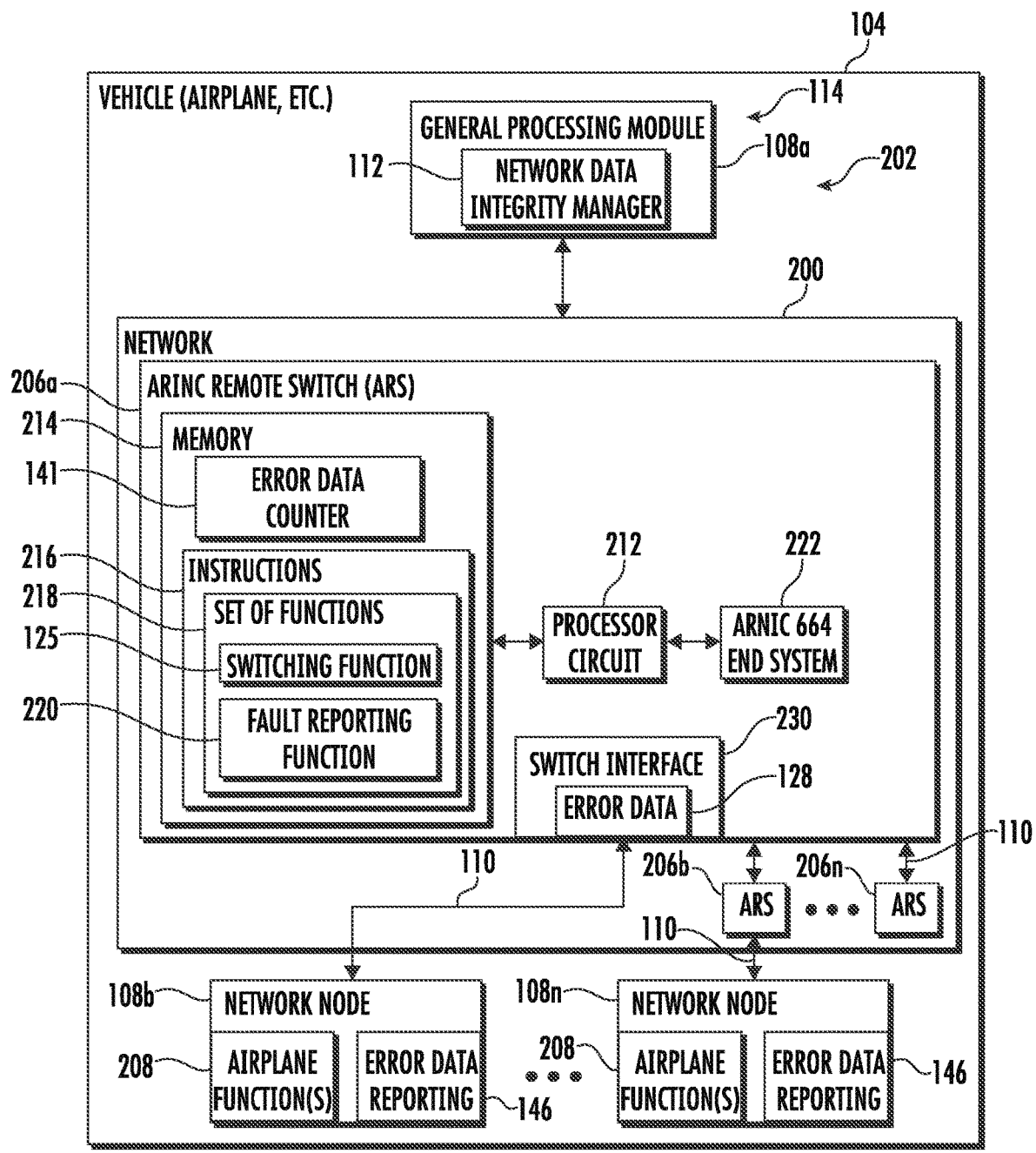
FIG. 2 is a block schematic diagram of a network including a system for data integrity monitoring in accordance with another example of the present disclosure.

FIG. 2 is a block schematic diagram of a network 200 including a system 202 for data integrity monitoring in accordance with another example of the present disclosure. In accordance with an example, the network 200 is a data network onboard a vehicle 104, such as an airplane or other vehicle or system. The network 200 is similar to the network 100 in FIGS. 1A and 1B except at least some or all network switches 106 in the network 200 are Aeronautical Radio, Incorporated (ARINC) remote switches 206, labeled as 206a-206n in FIG. 2. The plurality of ARINC remote switches (ARSs) 206a-206n are configurable to selectively interconnect two or more network nodes 108, labeled as 108a-108n in FIG. 2 by links 110. At least some of the ARSs 206 and network nodes 108 are configured for data integrity monitoring or include features for data integrity monitoring similar to that previously described.

Each ARS 206 includes a processor circuit 212 and a memory 214 associated with the processor circuit 212. In some examples, the processor circuit 212 and the memory 214 are the same as the processor circuit 124 and memory 136 in FIG. 1B. The memory 214 includes computer-readable program instructions 216 that, when executed by the processor circuit 212, cause the processor circuit 212 to perform a set of functions 218. Examples of the set of functions 218 include a switching function 125 and a fault reporting function 220. The fault reporting function 220 includes reading error data 128 on a switch interface 130 associated with a particular link 110 and transmitting a message to a network data integrity manager 112 that there is a fault on the particular link 110. In some examples, the fault reporting function 220 is similar to that described in FIGS. 6A-6B or FIGS. 7A-7B.

In some examples, at least some ARSs 206 also include an error data counter 141. As described with reference to FIG. 7A, a count of the error data counter 141 associated with a particular link 110 is increased by one (1) in response to a message received by the ARS 206 including error data 128 or error data 128 being read from the switch interface 230. In the example in FIG. 2, the error data counter 141 is stored in the memory 214 of the ARS 206.

In some examples, each ARS 206 also includes an ARINC 664 end system 222 connected to the processor circuit 212. The ARINC 664 end system 222 is configured to perform a particular function. The ARINC 664 end system 222 includes a network interface device that allows a network node 108 or a network switch 206 to transmit and receive on an ARINC 664 network 200. The ARINC 664 end system 222 handles ARINC 664 protocol elements and is essentially an enhanced Ethernet interface. ARINC 664 end systems 222 communicate with ARINC 664 switches 206, which police, filter, and route traffic to/from other ARINC end systems.

In accordance with an example where the vehicle 104 is an airplane, each network node 108 is configured to perform one or more airplane functions 208. Each of the network nodes 108 is also configured to perform an error data reporting function 146 as previously described with reference to FIGS. 1A and 1B.

In some examples, as illustrated in FIG. 2, the network 200 is coupled to a general processing module 114. A network data integrity manager 112 is embodied on the general processing module 114. In accordance with an example, the general processing module 114 and the network data integrity manager 112 are the same as that previously described with reference to FIG. 1A. In other examples, the general processing module 114 is replaced by a network monitoring node, such as network monitoring node 134 or 108n in FIG. 1B.

Figure 3:
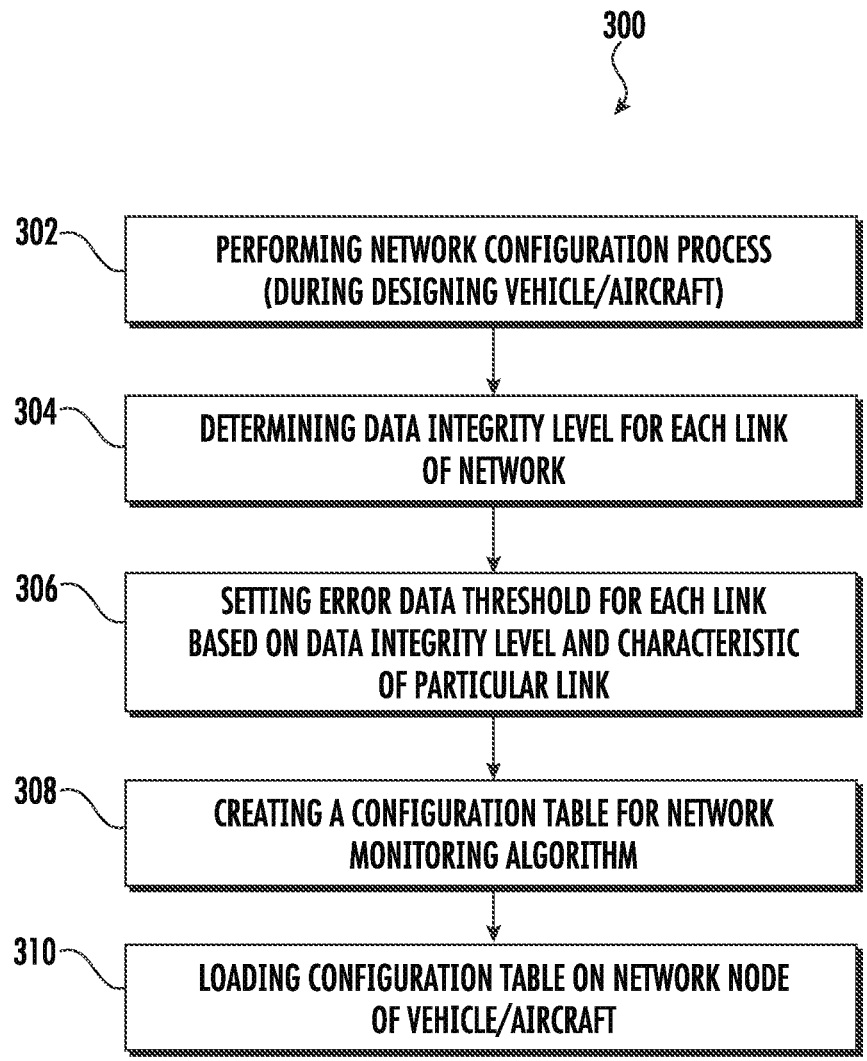
FIG. 3 is a flow chart of an example of a method for creating a configuration table for data integrity monitoring in accordance with an example of the present disclosure.

FIG. 3 is a flow chart of an example of a method 300 for creating a configuration table, such as configuration table 168, for data integrity monitoring in accordance with an example of the present disclosure. As previously described, an example of a configuration table 168 is illustrated in FIG. 5. In accordance with an example, the method 300 is embodied on and performed by any system including a processor circuit and an associated memory similar to those described herein. The memory includes computer-readable program instructions that, when executed by the processor circuit, cause the processor circuit to perform the set of functions described with reference to blocks 302-310.

In block 302, the method 300 includes performing a network configuration process for a network, such as network 100 or 200, during design of a vehicle 104, such as an airplane or other type vehicle.

In block 304, the method 300 includes determining a data integrity level for each link 110 of the network 100 or 200. Determining the data integrity level includes determining an amount of error data 128 that is acceptable on a particular link 110. As previously described, some network nodes 108 that perform more important or critical vehicle functions require a higher level of data integrity compared to other network nodes 108 that perform less important or less critical vehicle functions. Network nodes 108 and associated links 110 that perform more important or critical vehicle functions will have less tolerance for error data or corrupt data and will have a higher data integrity level compared to other network nodes 108 and associated links 110 that perform less important or critical vehicle functions. These network nodes 108 and associated links 110 will have a higher tolerance for corrupt data or error data or can accept a higher incidence of error data.

In block 306, the method 300 includes setting an error data threshold 504 for each link based on a data integrity level and characteristics of a particular link.

In block 308, the method 300 includes creating a configuration table 168 for a network monitoring algorithm, such as network monitoring algorithm 132 in FIG. 1B. The configuration table 168 includes identification 502 of each link 110 and an associated error data threshold 504.

In block 310, the method 300 includes loading the configuration table 168 on a network node 108, for example network monitoring node 134 in FIG. 1B.

Figure 6A:
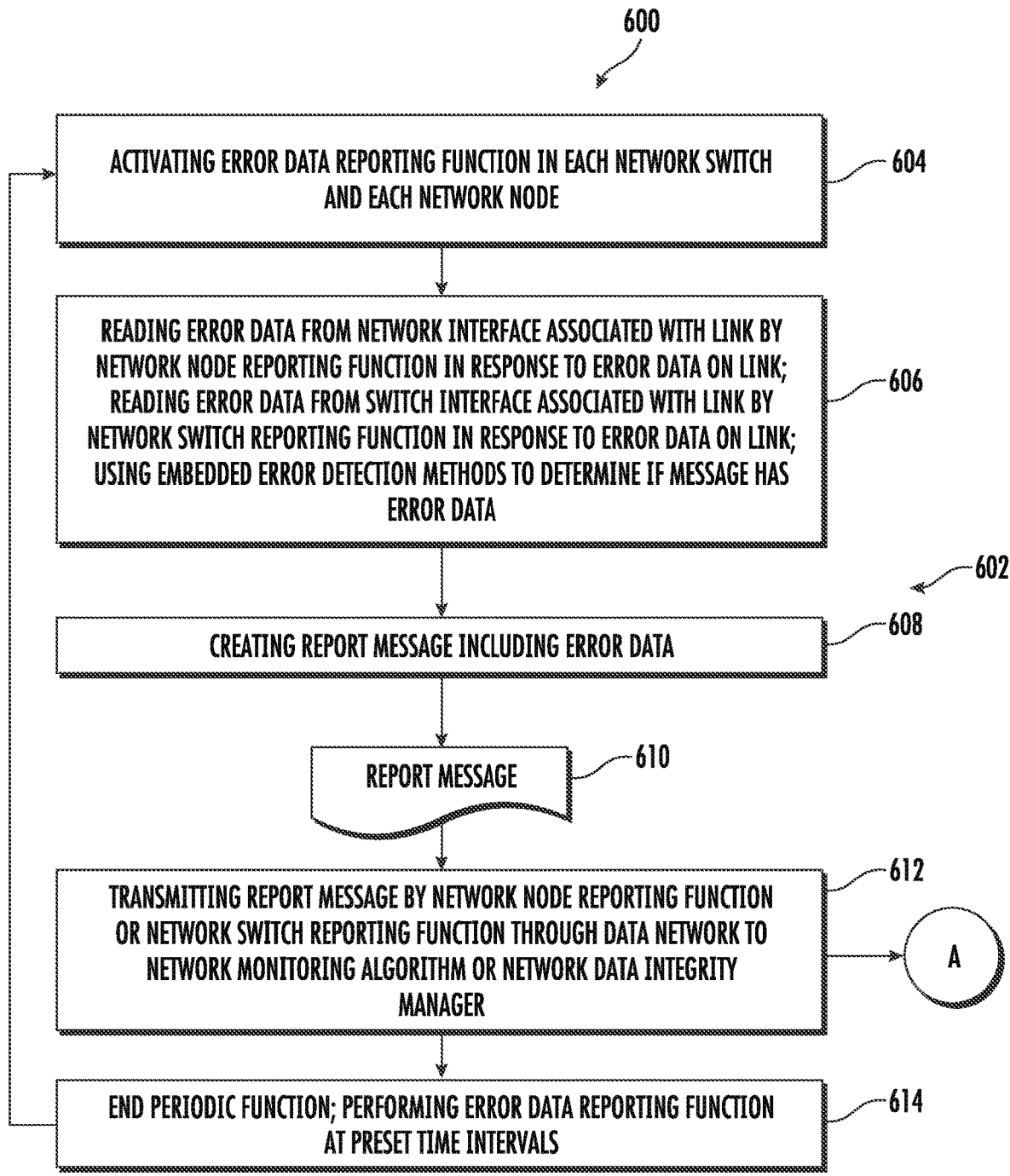
FIGS. 6A and 6B are a flow chart of an example of a method for monitoring data integrity of a network in accordance with an example of the present disclosure.
Figure 6B:
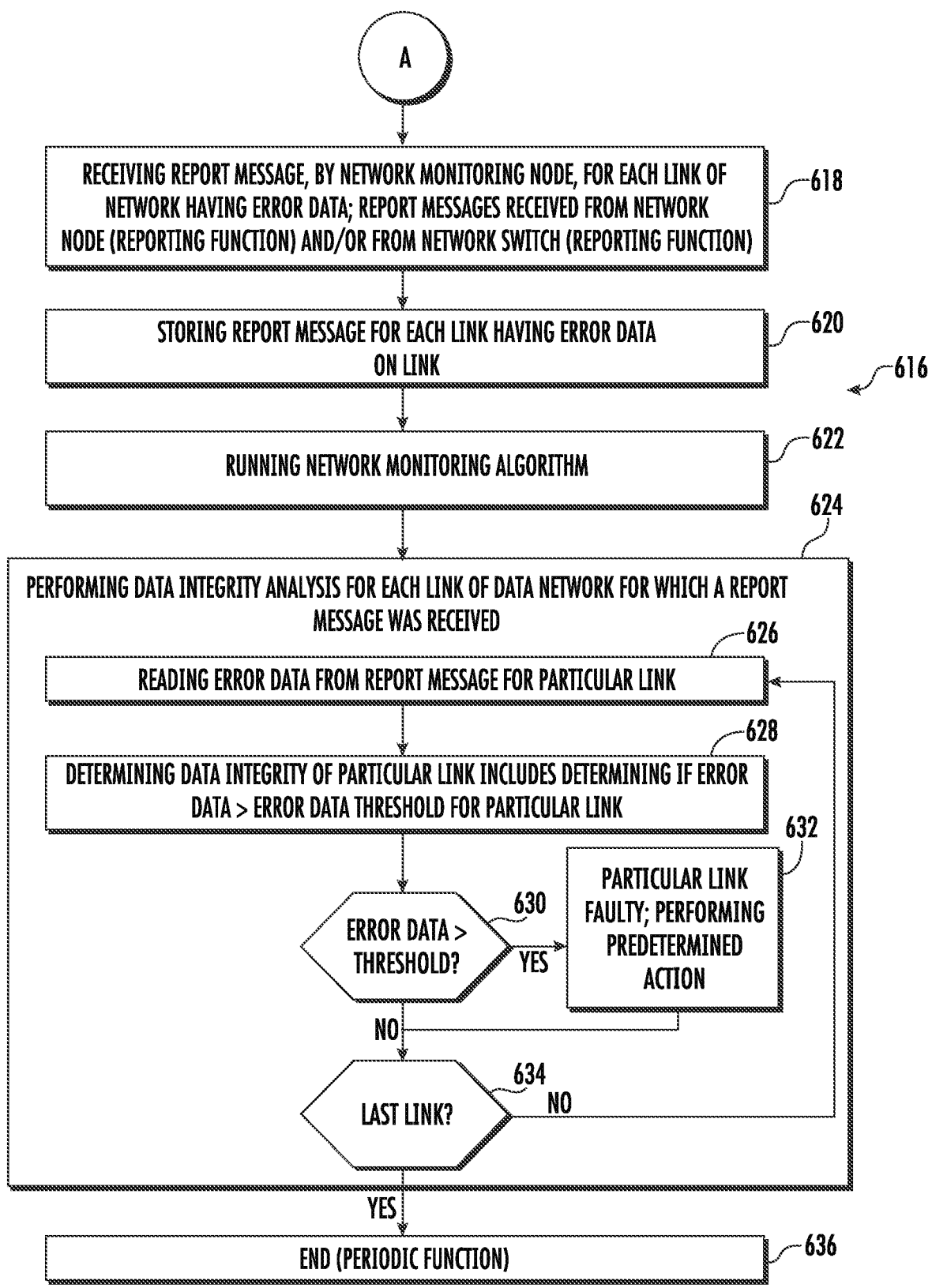

FIGS. 6A and 6B are a flow chart of an example of a method 600 for monitoring data integrity of a network 100 or 200 in accordance with an example of the present disclosure. In some examples, a first portion 602 (FIG. 6A) of the method 600 is embodied in and performed by the network switches 106 and network nodes 108 in FIGS. 1A-1B and 2. A second portion 616 (FIG. 6B) of the method 600 is embodied in and performed by the network data integrity manager 112 of the general processing module 114 (FIG. 1A and FIG. 2) and/or the network monitoring node 134 (FIG. 1B). For example, the error data reporting function 126 of the network switches 106 and the error data reporting function 146 of the network nodes 108 include the first portion 602 of the method 600. The undetectable corruption prediction algorithm 116 and/or the network monitoring algorithm 132 include the second portion 616 of the method 600.

In block 604, the method 600 includes activating an error data reporting function 126 in each network switch 106 and an error data reporting function 146 in each network node 108. In some examples the error data reporting function 126 or 146 is a periodic function, e.g., the error data reporting function 126 or 146 is performed at preset time intervals or for a preset time duration.

In block 606, the method 600 includes reading error data 128 from an interface (switch interface 130 or network interface 150) associated with a particular link 110 of the network 100 in response to error data 128 being present in a message, e.g., message 400 in FIG. 4, received on the particular link 110. Reading the error data 128 includes reading the error data 128 from a switch interface 130 of a network switch 106 by an error data reporting function 126 operable on a processor circuit 124 of the network switch 106. Reading the error data 128 also includes reading the error data 128 from a network interface 150 of a network node 108 by an error data reporting function 146 operable on a processor circuit 142 of the network node 108.

The method 600 in block 606 also includes using an embedded error detection method, such as cyclic redundancy cycles (CRCs) or frame check sequence (FCS) as previously described, to determine if a message includes error data 128.

In block 608, the method 600 includes creating a report message 610 including at least the error data.

In block 612, the method 600 includes transmitting the report message 610 to a network monitoring algorithm 132 operable on a processor circuit 158. The network monitoring algorithm 132 is configured to determine a data integrity of the particular link 110 based on the error data 128. Transmitting the report message 610 includes transmitting the report message 610 by the error data reporting function 126 of a network switch 106 or transmitting the report message 610 by the error data reporting function 146 of a network node 108.

In some examples, the report message 610 is transmitted to a network monitoring node 134. The network monitoring node 134 includes the network monitoring algorithm 132. In other examples, the report message 610 is transmitted to a network data integrity manager 112. The network data integrity manager 112 includes an undetectable corruption prediction algorithm 116. As previously described, the undetectable corruption prediction algorithm 116 is configured to predict an amount of undetected corrupt data or a number of undetected messages including error data 128 that may have been transmitted over a particular link 110 based on a number of corrupt messages or number of messages including error data 128 that are actually detected by reading error data 128 from a switch interface 130 or a network interface 150.

In block 614, the periodic function of performing error data reporting ends. The method 600 may return to block 604 for activating the error data reporting function at a next preset time interval. In some examples, monitoring the data integrity of the network 100 or 200 is performable on demand. In other examples, monitoring the data integrity of the network 100 or 200 is at preset time intervals.

In block 618, the method 600 includes receiving a report message 610, by a network monitoring node 134, for each link 110 of a plurality of links 110 of the network 100 or 200 having error data 128 on the link 110. The network monitoring node 134 includes the network monitoring algorithm 132. As previously described, report messages 610 are receivable from an error data reporting function 126 of a network switch 106 or from an error data reporting function 146 of a network node 108. In some examples, the method 600 includes receiving the report message 610 by a network data integrity manager 112 (FIG. 1 and FIG. 2).

In block 620, the method 600 includes storing the report message 610 for each link 110 having error data 128.

In block 622, the method 600 includes running the network monitoring algorithm 132.

In block 624, the method 600 includes performing a data integrity analysis for each link 110 of the network 100 or 200 for which a report message 610 was received. In the example in FIG. 6B, performing the data integrity analysis, includes blocks 626-634. In block 626, the method 600 includes reading the error data 128 from a report message 610 for a particular link 110 for which a report message 610 was received.

In block 628, the method 600 includes determining the data integrity of the particular link 110 by determining if the error data 128 is greater than an error data threshold, e.g., error data threshold 504 in the configuration table 168 in FIG. 5 for the particular link 110. The data integrity of the particular link 110 is faulty in response to the error data 128 being greater than the error data threshold 504 for the particular link 110.

In block 630, if the error data 128 is greater than the error data threshold 504, the method 600 advances to block 632. In block 632, the method 600 includes determining that the particular link 110 is faulty and performing a predetermined action in response to the particular link 110 being faulty. As previously described, examples of the predetermined action include but are not necessarily limited to shutting down the particular link 110, transmitting messages or data using another link 110 of the network until the particular link 110 is repaired or replace, and/or generating and transmitting a message indicating there is a fault on the particular link 110. The message is transmitted to a responsible entity for repairing or replacing of the faulty link.

In block 634, the method 600 includes determining if the particular link 110 is the last link or if there are other links for which a report message 610 was received. If the particular link 110 is not the last link, the method 600 returns to block 626 and the method 600 proceeds as previously described. If the particular link 110 is the last link, the method 600 advances to block 636. In block 636, the period function of monitoring the data integrity of the network 100 or 200 ends. Monitoring the data integrity of the network 100 or 200 is performable on demand or at periodic time intervals.

Figure 7A:
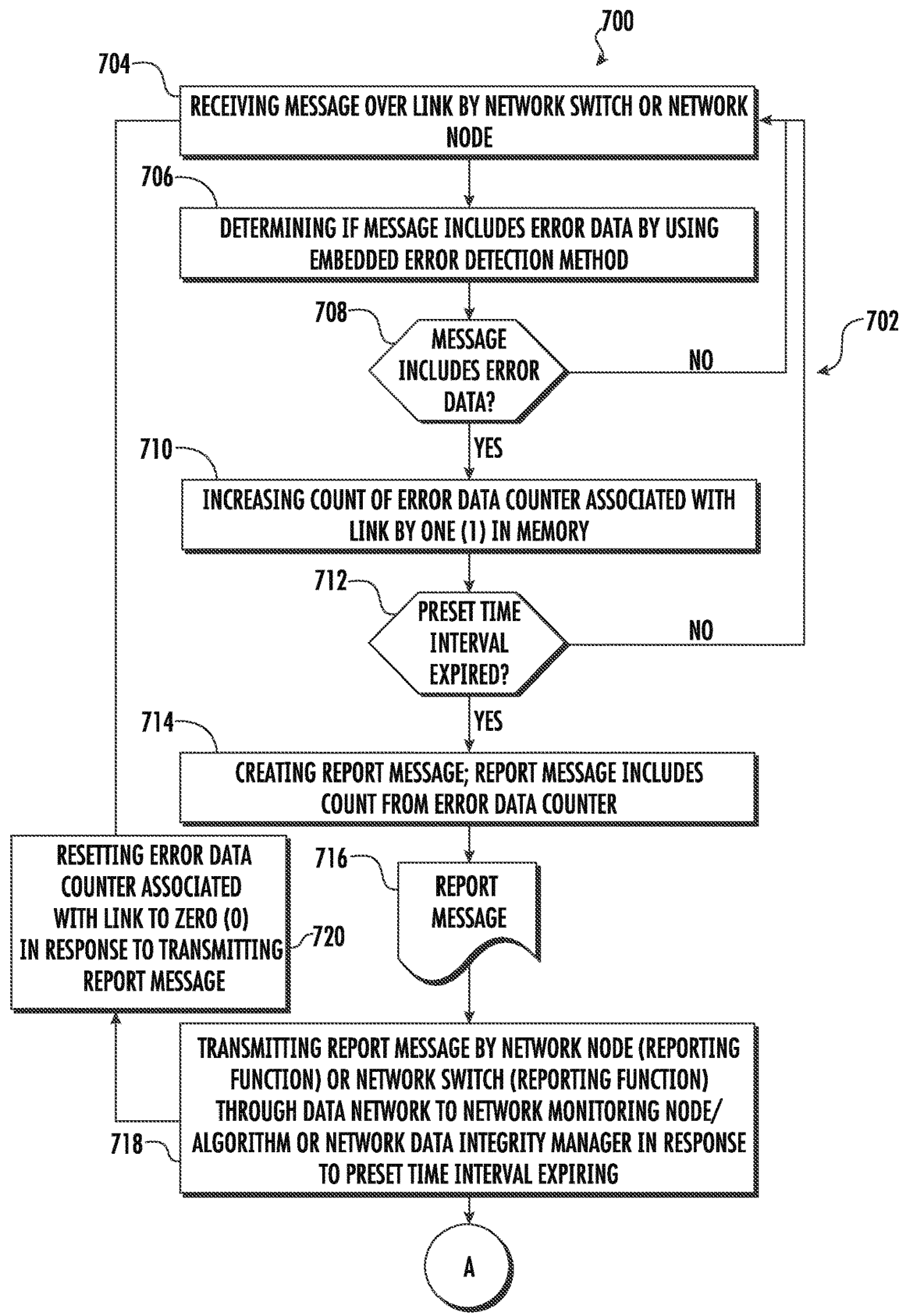
FIGS. 7A and 7B are a flow chart of an example of a method for monitoring data integrity of a network in accordance with another example of the present disclosure.
Figure 7B:
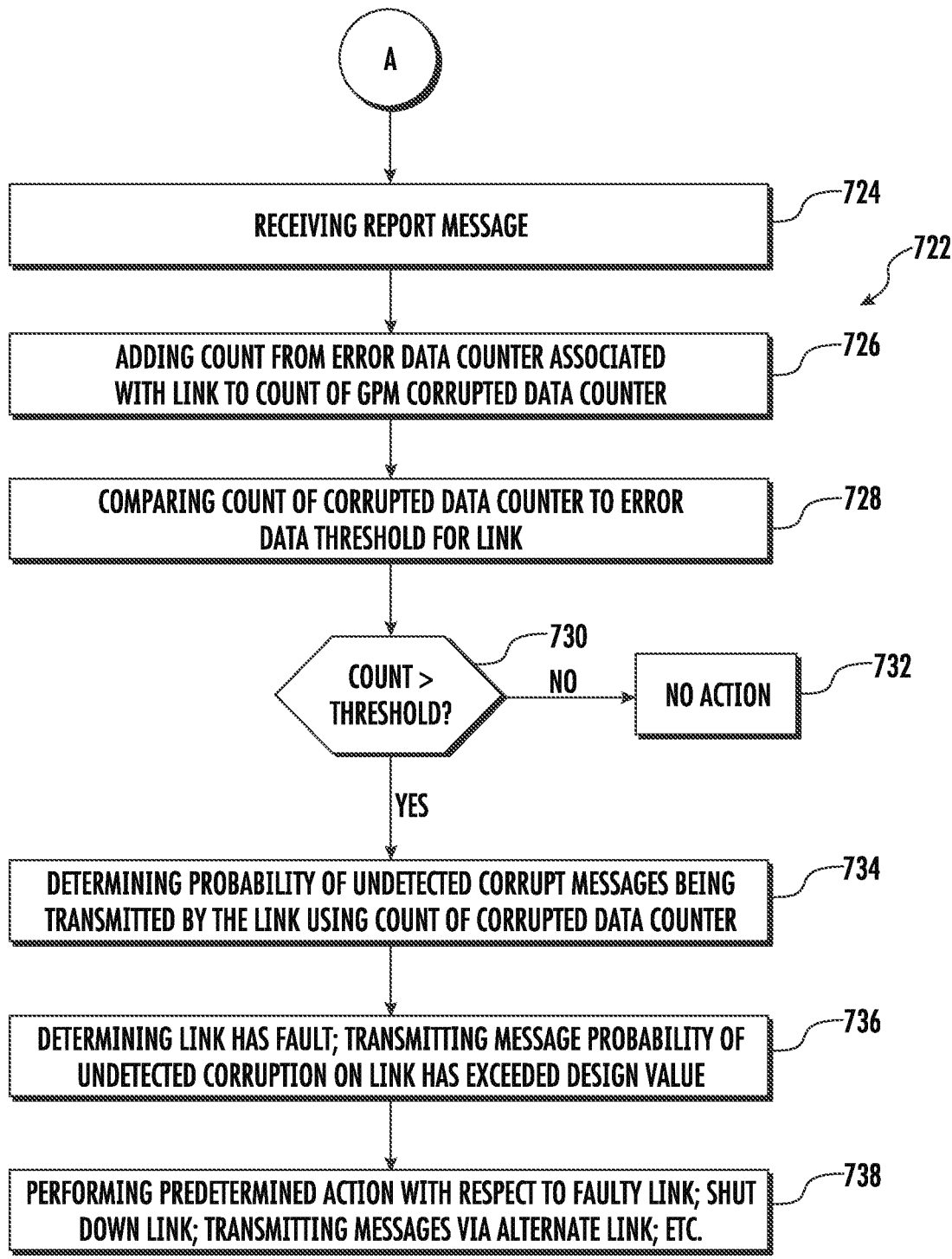

Referring to FIGS. 7A and 7B, FIGS. 7A and 7B are a flow chart of an example of a method 700 for monitoring data integrity of a network 100 or 200 in accordance with another example of the present disclosure. In some examples, a first portion 702 (FIG. 7A) of the method 700 is embodied in and performed by the network switches 106 and network nodes 108 in FIGS. 1A-1B and 2. A second portion 722 (FIG. 7B) of the method 700 is embodied in and performed by the network data integrity manager 112 of the general processing module 114 (network node 108a) and/or the network monitoring node 134 in FIG. 1B. For example, the error data reporting function 126 of the network switches 106 and error data reporting function 146 of the network nodes 108 include the first portion 702 of the method 700. The undetectable corruption prediction algorithm 116 and the network monitoring algorithm 132 include the second portion 722 of the method 700.

In block 704, the method 700 includes receiving a message over a link 110 of the network 100 or 200. The message is received by one of a network switch 106 or a network node 108.

In block 706, the method 700 includes determining if the message includes error data 128. In accordance with an example, the method 700 includes using an embedded error detection method to determine if the message includes error data 128. An error detection code is embedded in the message for use in determining if the message includes error data 128. Examples of the embedded error detection code include a cyclic redundancy cycle, a frame check sequence, or other embedded error detection code.

In block 708, if the message does not include error data 128, the method 700 returns to block 704 and the method 700 repeats as previously described. If the message does include error data 128, the method 700 advances to block 710.

In block 710, the method 700 includes increasing a count of an error data counter 141 (FIGS. 1B and 2) associated with the link 110 in response to the message including error data 128. The error data counter 141 is in a memory 136 of a network switch or a memory 152 of a network node 108. In accordance with an example, the count of the error data counter 141 associated with the particular link 110 is increased by one (1) in the memory of the network switch 106 or the network node 108 in response to the error data 128 being present in the message based on the embedded error detection method.

In block 712, a determination is made whether a preset time interval has expired. If the preset time period has not expired, the method 700 returns to block 704 allowing one or more additional messages to be received over the link 110 in response to the preset time interval not having expired, and increasing the count of the error data counter 141 for each additional message received by the network switch 106 or network node 108 that includes error data 128.

If the preset time interval has expired in block 712, the method 700 advances to block 714. In block 714, the method 700 includes creating a report message 716 in response to the message or messages received by the network switch 106 or network node 108 including error data 128, or the error data counter 141 having a count greater than zero (0). The report message 716 includes the count of the error data counter 141. The report message 716 is created after the preset time interval expires. The report message 716 includes the count from the error data counter 141 of the network switch 106 or the network node 108.

In block 718, the method 700 includes transmitting the report message 716 to a network data integrity manager 112 to determine whether the link 110 has a fault. In another example, the report message 716 is transmitted to a network monitoring node 134. In some examples, the method 700 includes transmitting the report message 716 by an error data reporting function 126 of the network switch 106, or an error data reporting function 146 the network node 108, depending upon which received the message or messages including the error data 128. The network data integrity manager 112 is configured to determine a probability of undetected corrupt messages being transmitted by a particular link 110 using the count from the error data counter 141 associated with the particular link 110.

In block 720, the method 700 includes resetting the error data counter 141 associated with a link 110 to zero (0) in response to transmitting the report message 716 to a network data integrity manager 112 or a network monitoring node 134. The method 700 returns to block 704, in response to transmitting the report message 716 and/or resetting the error data counter 141, for receiving additional messages over the link 110 by the associated network switch 106 or associated network node 108.

In block 724, the method 700 includes receiving the report message 716 by the network data integrity manager 112 or network monitoring node 134 from the network switch 106 or the network node 108. As previously described, the report message 716 includes the count from the error data counter 141 of the network switch 106 or the network node 108.

In block 726, the method 700 includes adding the count of the error data counter 141 to a count of a corrupted data counter 122 or using the count in the network monitoring algorithm 132 of a network monitoring node 134 to determine the data integrity of a particular link 110.

In block 728, the method 700 includes comparing the count of the corrupted data counter 122 to an error data threshold 504 for the link 110. In block 730, if the count of the corrupted data counter 122 is not greater than the error data threshold 504 for the link 110, the method 700 advances to block 732. In block 732, no action is taken. If the count of the corrupted data counter 122 is greater than the error data threshold 504 for the link, the method 700 advances to block 734.

In block 734, the method 700 includes determining a probability of undetected corrupt messages being transmitted by the link 110 using the count of the corrupted data counter 122. As previously described, the undetectable corruption prediction algorithm 116 is configured to determine the probability of undetected corrupt messages being transmitted by the link 110 using the count of the corrupted data counter 122.

In block 736, the method 700 includes determining the link 110 has a fault in response to the count of the corrupted data counter 122 being greater than the error data threshold 504 for the link 110. The method 700 also includes transmitting a message that a probability of undetected corruption on the link 110 has exceeded a design value in response to the count of the corrupted data counter 122 being greater than the error data threshold 504 for the link 110. In accordance with an example, the message is transmitted to a responsible entity for performing a predetermined action.

In block 738, the method 700 includes performing a predetermined action with respect to the faulty link 110. Similar to that previously described, examples of the predetermined action include shutting down the faulty link 110, transmitting messages via another link, or other predetermined action.

In some examples, the computer-readable program instructions are embodied in a computer program product that is similar to or the same as that described herein. The computer-readable program instructions are downloaded by a processor circuit and stored on the memory associated with the processor circuit.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for monitoring data integrity on a network onboard a vehicle, the method comprising:
reading error data from an interface associated with a particular link of the network in response to error data associated with a first vehicle function being present in a message received on the particular link;
creating a report message including the error data; and
transmitting the report message to a network monitoring algorithm operable on a processor circuit, wherein the network monitoring algorithm is configured to:
determine if the message includes the error data;
increase a first count of a first error data counter associated with the particular link by one (1) in a memory of a network switch or a network node in response to the error data being present, wherein the report message is created after a preset time interval expires and the report message comprises the first count from the first error data counter; and
determine a data integrity of the particular link based on a comparison of the first count to a first error data threshold for the first vehicle function.

2. The method of claim 1, further comprising:
performing a predetermined action in response to the particular link being faulty, wherein the data integrity of the particular link is faulty in response to the first count being greater than the first error data threshold.

3. The method of claim 2, wherein the predetermined action comprises at least one of:
shutting down the particular link; or
transmitting data using another link of the network until the particular link is repaired.

4. The method of claim 1, wherein said reading the error data comprises reading the error data from a network interface of a network node by an error data reporting function operable on a processor circuit of the network node, and wherein said transmitting the report message comprises transmitting the report message by the error data reporting function of the network node.

5. The method of claim 1, wherein said reading the error data comprises reading the error data from a switch interface of a network switch by an error data reporting function operable on a processor circuit of the network switch, and wherein said transmitting the report message comprises transmitting the report message by the error data reporting function of the network switch.

6. The method of claim 1, further comprising:
receiving a particular report message, by a network monitoring node, for each link, from a plurality of links of the network, having error data on the link, wherein the network monitoring node comprises the network monitoring algorithm;
reading the error data from the particular report message for each link;
determining a data integrity of each link by determining if the error data is greater than an error data threshold for each link, wherein the data integrity for the link is faulty in response to the error data being greater than the error data threshold; and
performing a predetermined action in response to the link being faulty.

7. The method of claim 1, further comprising:
receiving the message over the particular link, wherein the message is received by one of a network switch or a network node;
determining if the message includes the error data by using an embedded error detection method; and
increasing the first count of the first error data counter by one (1) in response to the error data being present based on the embedded error detection method.

8. The method of claim 7, further comprising transmitting the report message by an error data reporting function of the network switch or the network node that received the message, to a network data integrity manager function of a network switch or a network node, wherein the network data integrity manager is configured to determine a probability of undetected corrupt messages being transmitted by the particular link using the first count from the first error data counter.

9. A method for monitoring data integrity on a network, the method comprising:
receiving a message over a link of the network by a network switch or a network node;
determining if the message comprises error data;
creating a report message in response to the message comprising error data comprising a count of an error data counter;
transmitting the report message to a network data integrity manager function of a network switch or a network node to add the count to a total count of a corrupted data counter to determine whether the link has a fault;
adding the count of the error data counter to the count of the corrupted data counter;
comparing the count of the corrupted data counter to an error data threshold for the link; and
determining that the link has a fault in response to the count of the corrupted data counter being greater than the error data threshold for the link.

10. The method of claim 9, further comprising using an embedded error detection method to determine if the message comprises error data.

11. The method of claim 9, further comprising increasing the count of the error data counter associated with the link in response to the message comprising error data.

12. The method of claim 11, further comprising:
allowing one or more additional messages to be received over the link in response to a preset time interval not having expired; and
increasing the count of the error data counter for each additional message that comprises error data.

13. The method of claim 9, further comprising:
determining a probability of undetected corrupt messages being transmitted by the link using the count of the corrupted data counter; and
transmitting a message that a probability of undetected corruption on the link has exceeded a design value in response to the count of the corrupted data counter being greater than the error data threshold for the link.

14. A network comprising data integrity monitoring, the network comprising:
a plurality of network switches, wherein the plurality of network switches are configurable to selectively interconnect two or more network nodes from a plurality of network nodes, wherein each network switch comprises:
a network switch processor circuit;
a switching function operable on the network switch processor circuit and configured to selectively connect to another network switch or a network node from the plurality of network nodes; and a network switch error data reporting function operable on the network switch processor circuit and configured to:
  read error data from a switch interface associated with a particular link of the network;
  create a network switch report message including the error data; and
  transmit the network switch report message to a network monitoring algorithm, wherein the network monitoring algorithm is configured to determine a data integrity of the particular link; and a network data integrity manager comprising:
  a processor circuit;
  a memory associated with the processor circuit, wherein the memory comprises computer-readable program instructions that, when executed by the processor circuit, cause the processor circuit to perform a set of functions comprising:
    receiving a report error message comprising a count from an error data counter associated with a certain link, wherein the count of the error data counter is increased in response to each message received over the particular link that includes error data;
    adding the count of the error data counter to a count of a corrupted data counter;
    comparing the count of the corrupted data counter to an error data threshold for the particular link; and
    determining that the particular link has a fault in response to the count of the corrupted data counter being greater than the error data threshold for the particular link.

15. The network of claim 14, wherein at least some network nodes from the plurality of network nodes comprise:
  a network node processor circuit;
  a vehicle function operable on the network node processor circuit and configured to perform a particular function associated with a vehicle; and
  a network node error data reporting function operable on the network node processor circuit and configured to:
    read error data from a network interface associated with another particular link of the network;
    create a network node report message including the error data; and
    transmit the network node report message to the network monitoring algorithm, wherein the network monitoring algorithm is configured to determine a data integrity of the other particular link.

16. The network of claim 14, further comprising a network monitoring node of the plurality of network nodes, wherein the network monitoring node comprises:
  a processor circuit;
  the network monitoring algorithm operable on the processor circuit;
  a memory associated with the processor circuit; and
  a configuration table stored in the memory, wherein the configuration table comprises an identification of each link from a plurality of links of the network and an error data threshold associated with each link, and wherein the configuration table is configured to be used by the network monitoring algorithm to determine if the error data read from an interface associated with a certain link of the network is greater than the error data threshold for the certain link.

17. The network of claim 16, wherein the network monitoring node is configured to perform a set of functions comprising:
  receiving a particular report message for each link from a plurality of links of the network having error data on the link;
  reading the error data from the particular report message for each link;
  determining a data integrity of each link by determining if the error data is greater than an error data threshold for each link, wherein the data integrity for the link is faulty in response to the error data being greater than the error data threshold; and
  performing a predetermined action in response to the link being faulty.

18. The method of claim 1, further comprising:
  reading second error data from a second interface associated with a second particular link of the network in response to second error data associated with a second vehicle function being present in a second message received on the second particular link;
  creating a second report message including the second error data; and
  transmitting the second report message to the network monitoring algorithm, wherein the network monitoring algorithm is further configured to:
    determine if the second message includes the second error data;
    increase a second count of a second error data counter associated with the second particular link by one (1) in a memory of a network switch or a network node in response to the second error data being present, wherein the second report message is created after a preset time interval expires and the second report message comprises the second count from the second error data counter; and
    determine a data integrity of the second particular link based on a comparison of the second count to a second error data threshold for the second vehicle function different from the first error data threshold.

19. The method of claim 1, further comprising
adjusting the first error data threshold from a first value to a second value based on a data integrity level requirement associated with the first vehicle function.

* * * * *